United States Patent [19]
Reed et al.

[11] Patent Number: 6,041,239
[45] Date of Patent: Mar. 21, 2000

[54] METHOD AND APPARATUS FOR DISTRIBUTING OFFERED LOAD IN A WIRELESS COMMUNICATIONS SYSTEM

[75] Inventors: John Douglas Reed, Arlington; Jack Anthony Smith, Haltom City, both of Tex.

[73] Assignee: Motorola, Inc., Schaumburg, Ill.

[21] Appl. No.: 08/896,576

[22] Filed: Jul. 18, 1997

[51] Int. Cl.⁷ ............................... H04Q 7/20; H04Q 7/22
[52] U.S. Cl. .......................... 455/453; 455/450; 455/432; 455/452; 455/438
[58] Field of Search .................................... 455/452, 453, 455/450–454, 438, 439, 443, 444, 446, 437, 436, 432

[56] References Cited

U.S. PATENT DOCUMENTS

| | | | |
|---|---|---|---|
| 4,670,899 | 6/1987 | Brody et al. | 379/60 |
| 5,682,419 | 10/1997 | Grube et al. | 379/60 |
| 5,754,959 | 5/1998 | Ueno et al. | 455/453 |
| 5,758,287 | 5/1998 | Lee et al. | 455/450 |
| 5,793,842 | 8/1998 | Schloemer et al. | 379/58 |

*Primary Examiner*—David R. Hudspeth
*Assistant Examiner*—Vijay B. Chawan
*Attorney, Agent, or Firm*—L. Bruce Terry

[57] ABSTRACT

For a wireless communications system service area (20), a population database (24) is selected that describes a population in database regions (22) within the wireless communication service area (20). A transportation database (46) that describes transportation arteries in the wireless communications system service area (20) is also selected. The process then calculates an initial offered load (70) for each database region (210), wherein the initial offered load is based upon market factors. Thereafter, a portion of each initial offered load (70) is allocated (212) to a transportation distribution pool (76). Other portions of each initial offered load (70) may be allocated (212) to regional distribution pools (74). The offered load in the transportation distribution pool (76) is then distributed (220) over the transportation arteries (36, 38, 40). Finally, a database region offered load is calculated (226) for each database region (22) by accounting for allocation of offered loads to the transportation distribution pool (76) and distribution of offered load in the transportation distribution pool (76) over the transportation arteries (36, 38, 40) in each database region (22).

27 Claims, 6 Drawing Sheets

METHOD AND APPARATUS FOR DISTRIBUTING OFFERED LOAD IN A WIRELESS COMMUNICATIONS SYSTEM

FIELD OF THE INVENTION

This invention relates in general to planning tools for wireless communications systems and, in particular, to a method and system for calculating and distributing an offered load over a wireless communications systems service area for the purpose of facilitating base station layout in the service area.

BACKGROUND OF THE INVENTION

Cellular radio systems use fixed base station transceivers, which are typically mounted on buildings or towers. These base station transceivers transmit and receive radio signals from wireless mobile units (also known as subscriber units). Because these base station transceivers are fixed, changing an initial deployment location is usually performed at considerable expense. Therefore, the initial layout or placement of such base station transceivers plays a fundamental role in determining both the performance and profitability of any cellular system layout. Assigning too few base station transceivers to a given area results in blocked call attempts, increased interference levels, and service outage holes; assigning too many base station transceivers to a given area increases system costs substantially, thereby decreasing profitability. As such, the determination of the correct base station transceiver placement and density is an important step in the design of any cellular system.

In the past, a common method for base station transceiver layout begins with selecting demographic information, such as census data for regions (e.g., a zip code or similar defined region of interest) within a given service area. The population for each region is then multiplied by an appropriate scale factor in order to determine the offered load in Erlangs (one Erlang is equal to one full hour of phone use or conversation per hour of clocktime or 1 call minute per minute) for that subregion. These offered loads are then used to assign base station transceivers within each subregion.

The problem with this method of assigning offered load based on fixed demographic information is that it fails to account for the dynamic nature of the users. In essence, it assumes that the population described by the demographic database remain in their homes. In practice, however, large percentages of the population travel to and from their places of employment or recreation during the daytime hours, which are the peak demand hours for cellular traffic. In addition, those persons remaining at home typically use their standard wireline phones for conducting conversations rather than paying the "per minute" charges associated with cellular calls. As such, base station transceiver layout based on standard census information typically overpredicts offered load within residential areas and typically underpredicts offered load within commercial areas and along main transportation arteries.

Thus it should be apparent that there is a need for an improved method and system for distributing offered load that eliminates the error introduced by designing a communications system based upon static data that represents users in their home.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF THE INVENTION

The load that will be offered to a wireless communication system over a defined service area is predicted using a set of demographic and transportation route databases, along with a user-selectable set of input parameters, some of which may be referred to as market factors or road density factors. These databases may be commercially available or assembled by the users. The user-selectable input parameters are used to estimate the load offered by each region in the service area and distribute this load appropriately throughout the service area. The output, which may be in the form of a map depicting the offered load, differs from offered load predictions obtained using prior art methods in that significant percentages of the offered load may be removed from selected regions and placed on the transportation arteries or in other regions in order to model movement of the users between their residential neighborhoods and places of work or leisure. Additionally, the input parameters may be a function of time, which means that different maps may be obtained for various times of day. For example, during weekday morning rush hours, larger amounts of the offered load may be placed on the transportation arteries compared to the load placed on the transportation arteries during the hours of 9–11 a.m.

Figure 1:
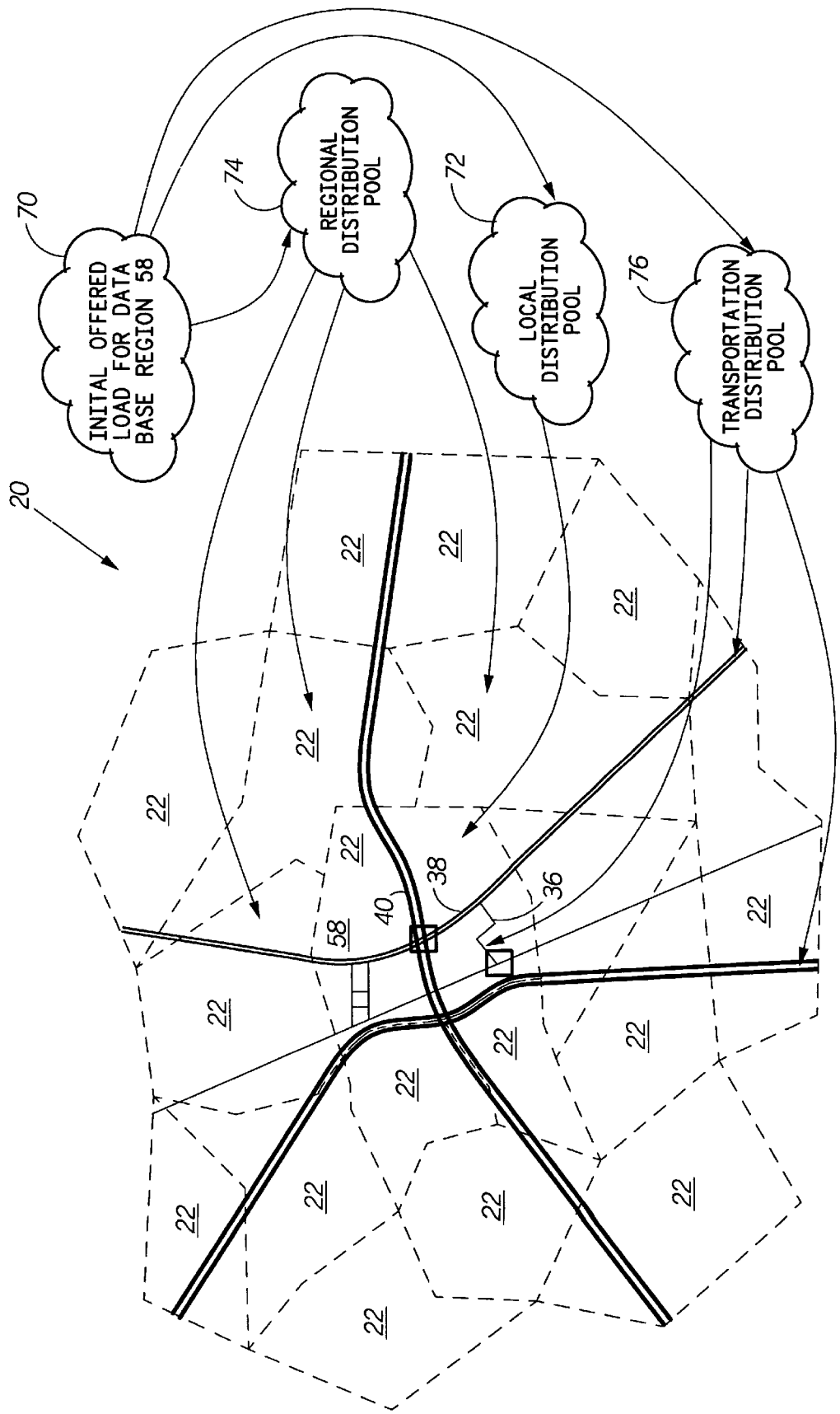
FIG. 1 depicts a model of a wireless communications system service area having database regions and transportation arteries in accordance with the method and system of the present invention.
Figure 2:
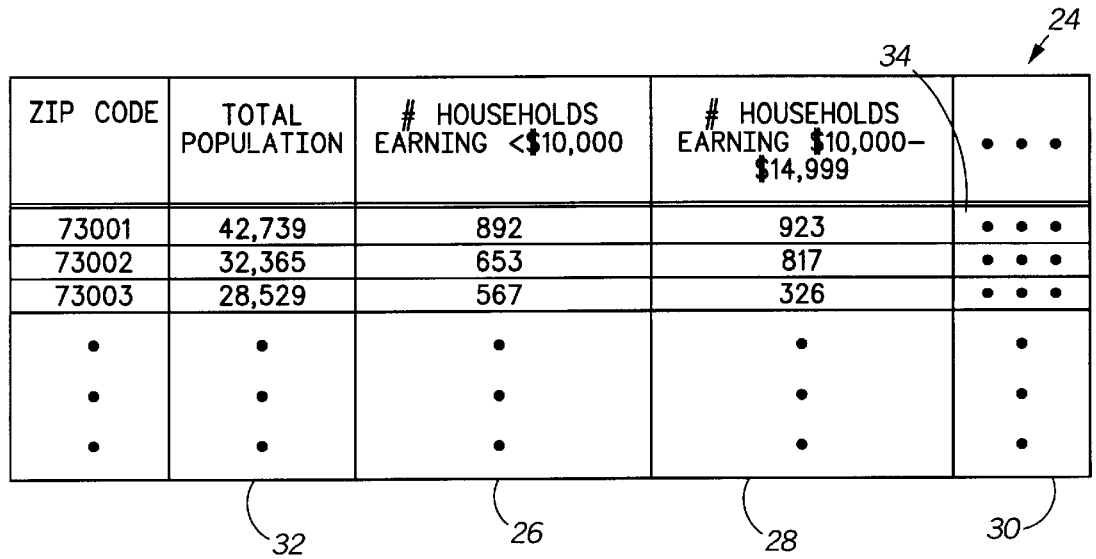
FIG. 2 illustrates an example of records and fields in a population database in accordance with the method and system of the present invention.

With reference now to FIG. 1, there is depicted a wireless communications system service area model 20, which has been divided into database regions 22. Such database regions 22 correspond to areas described in records in a population database that is either generated by the user or purchased commercially. An example of such a population database is shown in FIG. 2. As may be seen in FIG. 2, the population database 24 describes a population in database regions, which in this example coincide with zip codes. In population database 24 the population is described in terms of income categories 26–30 and total population 32. The information contained in population database 24 may be purchased from the U.S. Government Census Bureau, or MapInfo Corporation in Troy, N.Y., 12180.

Other population databases may include data that describes the number of people in various occupations in each database region, the number and type of job in each database region, the number of vehicles in each database region, or other such data that may have a relationship with the use of the wireless communication system. One example of a relationship between the population database and the use of the wireless communication system is an assumption that 50% of the people earning over $50,000.00 a year own a cellular telephone. The percentage in this assumption may be referred to as a market factor. Other assumptions may be made or determined by examining market factors or market data that statistically describes a typical wireless communication systems user.

With reference again to FIG. 1, there is also depicted in the service area transportation arteries, which primarily include roads. The roads are illustrated with various line types, including lighter and heavier lines, and single and double lines. An example of a small road is shown at reference numeral 36. An example of an intermediate road is shown at reference numeral 38, and an example of a large road is shown at reference numeral 40. Small road 36 may be a neighborhood road or smaller city street. Intermediate road 38 may be connecting roads or county roads, and may include multiple lanes or a divided roadway. Large road 40 may include limited access roads or interstate highways. Small roads 36 have the least capacity and carry the least amount of traffic; large roads 40 have the highest traffic capacity.

Figure 3:
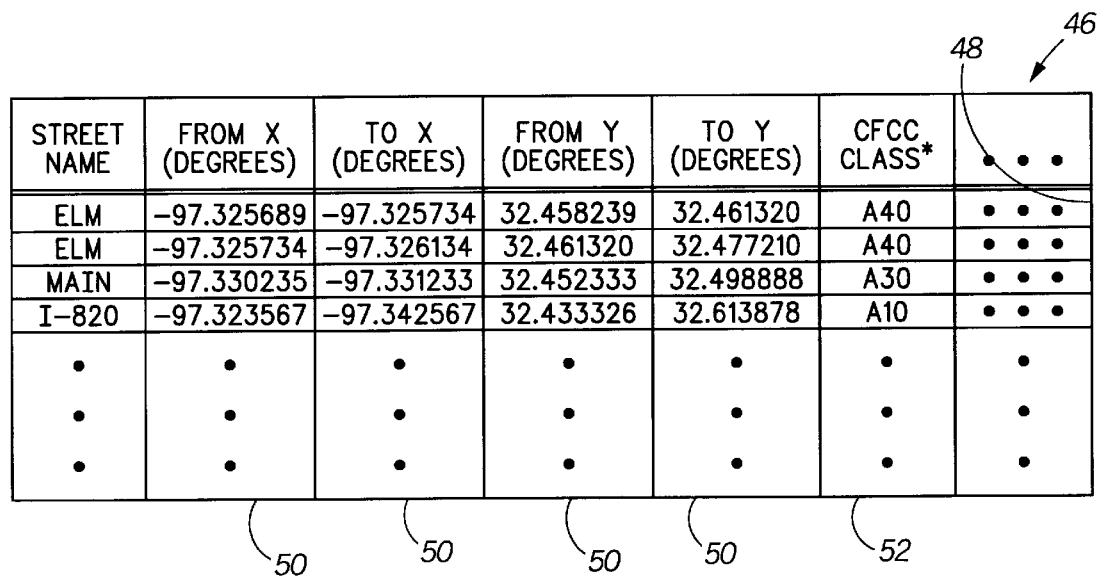
FIG. 3 depicts an example of records and fields in a transportation database in accordance with the method and system of the present invention.

Referring now to FIG. 3, an example of a transportation database 46 is illustrated. As shown, records in transportation database 46 describe transportation arteries, or streets, in the wireless communications system service area. Record 48, for example, describes a portion of Elm Street using latitude and longitude 50, and further describes the capacity 52 of this portion of Elm Street. In this example, capacity 52 is related to a road class, where such classes are associated with a road type having a particular capacity. Such capacity may be measured as a number of vehicles per hour which travel that portion of Elm Street. Capacity may also be expressed as a number of vehicles per unit distance, such as 10 vehicles per 100 meters.

Figure 4:
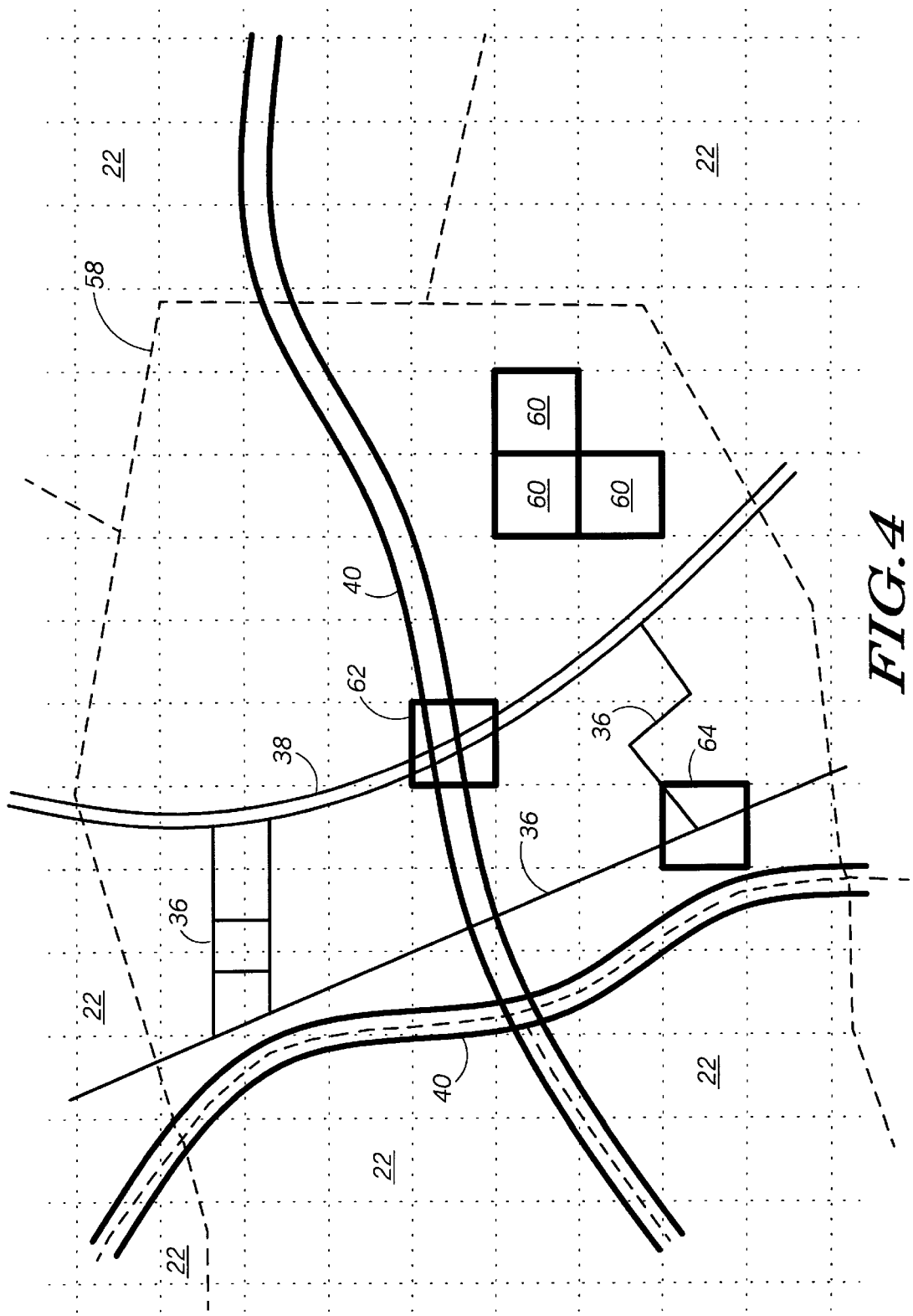
FIG. 4 illustrates an expanded view of a database region shown in FIG. 1 in accordance with the method and system of the present invention.

With reference now to FIG. 4, there is depicted a more detailed view of a selected database region in FIG. 1. As shown, database region 58 includes small roads 36, intermediate road 38, and large roads 40. And according to one embodiment of the present invention, database region 58 may be divided into a number of tiles, shown generally at reference numeral 60, and specifically at reference numerals 62 and 64.

The purpose of dividing database region 58 into tiles 60–64 is to enable the calculation of the offered load with a higher resolution than the resolution offered by larger database regions 22. In other words, an offered load may be calculated for a particular tile rather than just calculating an offered load for an entire database region. In some embodiments of the present invention, database regions may be small enough that it is not necessary to further localize offered load to tiles in the database region.

A further advantage of using tiles in the database region is that databases having a higher resolution, such as a transportation database that specifically locates transportation arteries, may be used to calculate offered loads with a higher resolution, while offered load calculations made with databases having a lower resolution, such as a population database that describes the population in relation to an entire zip code, may be used to calculate offered load less accurately with a lower resolution.

As may be seen in FIG. 4, some tiles, such as tile 62, include large roads 40 and intermediate roads 38, while other tiles, such as tiles 64 include only small roads 36. Thus, offered load representing users on roads may be more accurately located in specific tiles containing the roads.

Figure 5:
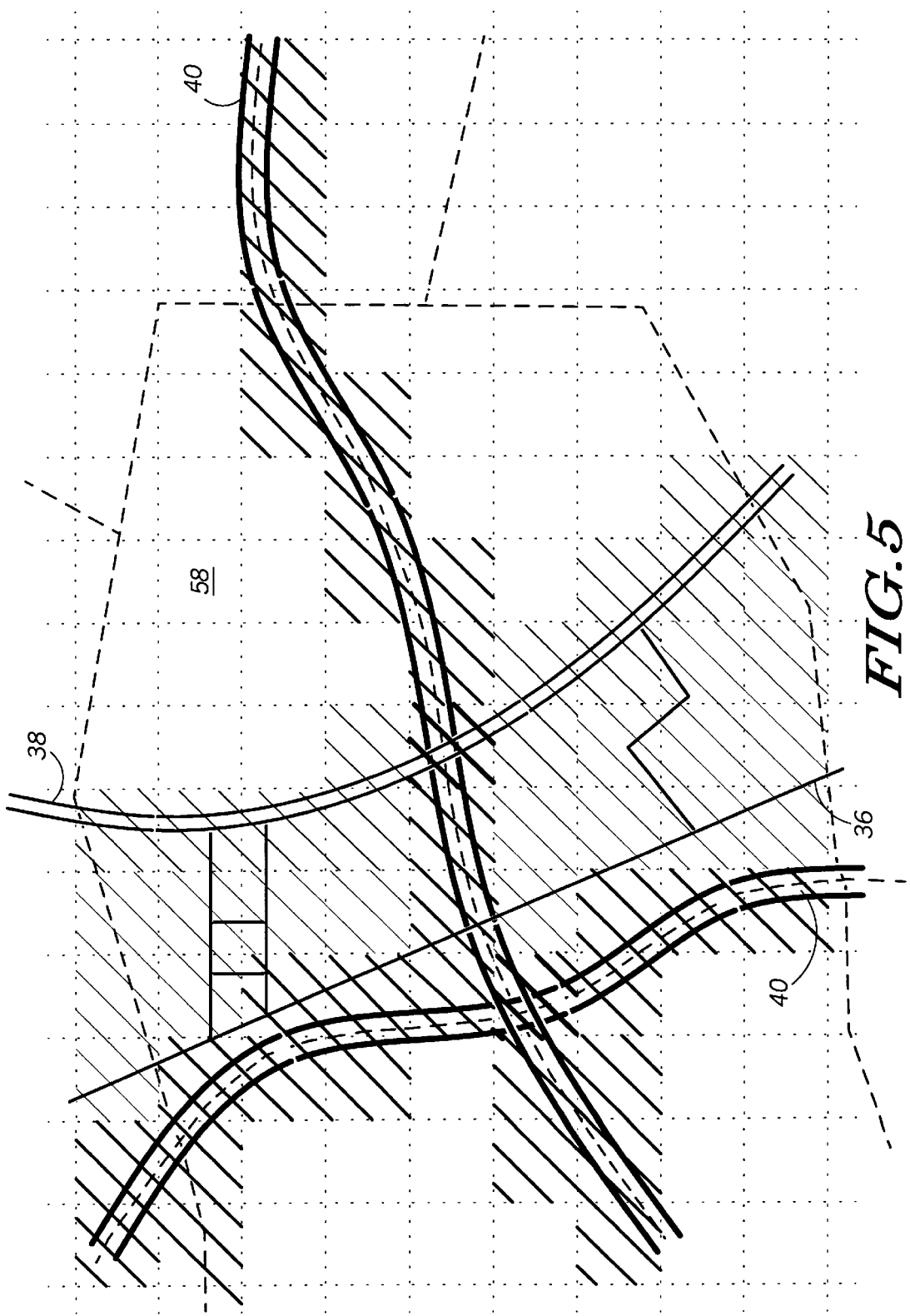
FIG. 5 is a logic flowchart that illustrates the method of calculating and locating an offered load according to the method and system of the present invention.

With reference now to FIG. 5, there is depicted a logic flowchart that illustrates the method of calculating and locating an offered load according to the method and system of the present invention. As illustrated, the process begins at block 200 and thereafter passes to block 202, wherein a population database is selected. Such a population database describes the population in the wireless communications system service area according to regions known as database regions. Each database region corresponds to a record in the database, such as record 34 in population database 24. Other than describing the total population in a database region, the population database may group the population into income categories, occupational categories, or other such demographic categories. The population database may be commercially available or may be a custom database gathered by the user of the present invention.

The population database may also include business demographic information, such as types and quantity of businesses in each database region, the total number of employees in each database region, and the earning brackets of employees in each database region.

Next, database regions may be divided into smaller regions known as tiles, as illustrated at block 204. This is an optional step which may be used to increase the resolution of the location of the offered load. For example, if the population database selected in block 202 includes relatively large database regions, the user may wish to use smaller regions, or tiles, in order to more precisely locate a base station to handle a particular offered load. If, for example, a database region is large enough to include multiple base stations, using tiles to more specifically locate the offered load will help the designer select base station locations that will not be overloaded.

An example of a database region divided into tiles 60–64 is shown in FIG. 4.

Thereafter, a transportation database is selected, as depicted at block 206. The selected transportation database preferably locates and describes the transportation arteries in the service area. The transportation arteries primarily include roads, but may also include railways, ferries, or other transportation arteries for alternate modes of transportation.

After selecting the appropriate databases, a road density factor for each tile in the service area is calculated using the transportation database, as illustrated at block 208. Such road density factors are proportional to the capacity of the portions of roads included in each tile. The road density factor may be calculated by determining the highest capacity transportation artery in the tile and looking up an associated appropriate road density factor. For example, in tile 62 in FIG. 4, the road density factor may be one associated with large road 40 because large road 40 is the largest road in tile 62. In tile 64, the factor associated with small road 36 may be selected for the road density factor.

Next, an initial offered load is calculated for each database region, as depicted in block 210. The initial offered load is calculated using market factors and information in the population database. This initial offered load may be as simple as multiplying the total population by a percentage that represents an assumption of the number of people per 100 people that own a cellular phone, or that are likely to use the wireless communication system. A more detailed computation may involve examining particular income groups and using separate market factors with each group to determine the number of users within each income group. Similarly, other market factors may be applied to demographic data that has been separated into employment categories or other similar categorization of the population. Age groups in the population database may also be used in calculating the initial offered load.

An example of a formula for calculating the initial offered load is shown below:

$$OL(DR_1) = EPP_1 \cdot PDR_1 \cdot \left[ \left( \sum_{i=1}^{M} \alpha_i \cdot PIL_i \right) + \left( \sum_{j=1}^{N} \beta_j \cdot PAL_j \right) + \left( \sum_{k=1}^{O} \gamma_k \cdot PEL_k \right) \right],$$

where:

$OL(DR_1)$=offered load in database region 1, $EPP_1$=Erlangs per population in database region 1 (describes the likelihood that a user will make a call during the time of interest), $PDR_1$=population for database region 1, $PIL_i$=population of database region 1 with income level i, $\alpha_i$=scalefactor corresponding to population of database region 1 with income level i, $PAL_j$=population of database region 1 of age level j, $\beta_j$=scalefactor corresponding to population of database region 1 with age level j, $PEL_k$=population of database region 1 with education level k, $\gamma_k$=scalefactor corresponding to population of database region 1 with education level k, M=number of distinct income levels of interest in database region 1, N=number of distinct age levels of interest in database region 1, O=number of distinct education levels of interest in database region 1, and EPP, $\alpha_i$, $\beta_j$, and $\gamma_k$ are user-defined coefficients used to scale the ultimate load based on economic assumptions and practical considerations.

After calculating the initial offered load, the initial offered load is allocated to a plurality of distribution pools, as illustrated at block 212. Such distribution pools may include a local distribution pool, a region distribution pool, and a transportation distribution pool.

Referring to FIG. 1, the initial offered load for database region 58 is shown at reference numeral 70. The initial offered load is allocated to local distribution pool 72, regional distribution pool 74, and transportation distribution pool 76. In other embodiments of the present invention, additional distribution pools may be used.

After allocation of the initial offered load to the plurality of distribution pools, the process selects a first database region, as depicted at block 214. Thereafter, the process distributes the local distribution pool to tiles in the selected database region, as illustrated at block 216. In one embodiment of the present invention, the local distribution pool is distributed evenly over the tiles in the selected database region. Other means for distributing the local distribution pool include distributing to places of work or leisure and distributing as a function of distance. Yet another method of distributing the offered load is to use land use-land clutter (LULC) data to distribute the offered load in relation to the land clutter. As part of the U.S. geological survey, land clutter categorizes what is on the surface of a region. Examples of land clutter categories include: farm land, residential, industrial, forest, and other similar categories.

Next, the process distributes the regional distribution pool to tiles in database regions that are adjacent to the selected database region, as depicted at block 218. In one embodiment of the present invention, the regional distribution pool is divided equally among adjacent database regions and then equally to tiles in each of the adjacent database regions. For example, as shown with a few representative arrows in FIG. 1, regional distribution pool 74 is distributed among database regions 22 that are adjacent to database region 58. An adjacent database region may be defined as one that shares a common point along a border between the selected database region and the adjacent database region.

In another embodiment of the present invention, the regional distribution pool may be distributed to database regions more distant than the adjacent database regions. And, if more distant database regions receive a portion of the offered load, such portion may be smaller than the portion of the offered load received by an adjacent database region. The fact that adjacent database regions may receive a higher portion of the offered load in the original distribution pool represents an assumption that more people travel from the selected database region to adjacent database regions than from the selected database region to a more distant database region.

In one embodiment of the present invention, offered load distributed from the regional distribution pool may be distributed evenly to tiles in either an adjacent database region or a more distant database region. In an alternate embodiment, the regional distribution pool may be distributed to tiles in other database regions based upon the distance from that particular tile to the selected database region.

After distributing the offered load in the regional distribution pool, the process distributes the offered load in the transportation distribution pool to tiles over the service area based upon the road density factor associated with each tile, as illustrated at block 220. Thus, tile 62 in FIG. 4, which has a relatively high road density factor, will receive a larger portion of the offered load in the transportation distribution pool than tile 64, which has a relatively low road density factor. Tiles without roads or transportation arteries, may not receive any of the offered load in the transportation distribution pool. A portion of the distribution pool may be further allocated specifically for distribution to roads within the database region and adjoining regions. This distributed portion may also be distributed based upon the distance from the originating database region.

Once the local, regional, and transportation distribution pools have been distributed, the process determines whether or not all database regions have been analyzed, as depicted at block 222. If the distribution pools of all the database regions have not been distributed, the process selects the next database region having undistributed pools, as illustrated at block 224. If all distribution pools in all database regions have been distributed, the process enters an accounting process to account for allocations to, and distributions from, the local, regional, and transportation distribution pools and calculates the offered load for each tile in a service area, as depicted at block 226. Thus, a tile in the service area may receive allocations of offered load in the form of a local distribution from the same database region, a regional distribution from an adjacent or distant database region, and a distribution from the transportation distribution pool that depends upon the road density factor for the particular tile. Thus, examining the accounting from a database region perspective, some of the initial offered load remains in the database region, another portion of the initial offered load is distributed to adjacent or other more distant database regions, and still another portion of the initial offered load is distributed to roads within the selected database region and roads within other database regions in the service area. Some distributions add to the total offered load in the database region while other distributions subtract from the initial offered load of the selected database region.

The process then terminates, as illustrated at block 228. However, once an offered load is calculated for each tile in the service area, the offered load in the service area may be graphically represented in either a 3-dimensional graph or a 2-dimensional graph, such as the graph shown in FIG. 6. Tiles shown in FIG. 6 with heavy cross-hatching represent tiles with a higher offered load; tiles with lighter cross-hatching represent a lower offered load.

Figure 7:
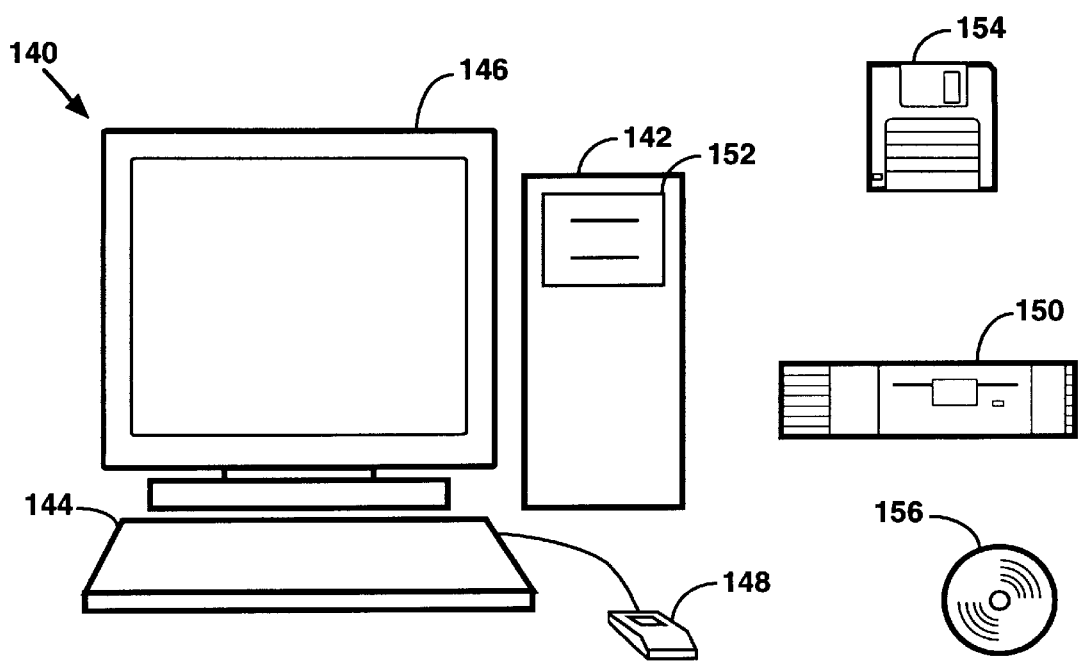
FIG. 7 depicts a data processing system that may be used to implement the method and system of the present invention.

With reference now to FIG. 7, there is depicted a data processing system 140, which may be used to implement an embodiment of the method and system of the present invention. Data processing system 140 may include processor 142, keyboard 144, display 146, and pointing device 148. Keyboard 144 provides means for entering data and commands into processor 142. Display 146 may be implemented utilizing any known means for displaying textual, graphical, or video images, such as a cathode ray tube (CRT), a liquid crystal display (LCD), an electroluminescent panel, or the like. Pointing device 148 may be implemented utilizing any known pointing device, such as a trackball, joystick, touch sensitive tablet or screen, track pad, or as illustrated in FIG. 5, a mouse. Pointing device 148 may be utilized to move a pointer or a cursor on display 146.

Processor 142 may be coupled to one or more peripheral devices, such as CD-ROM 150.

Data processing system 140 includes means for reading data from a storage device. Such means for reading data may include: a hard disk drive internal or external to processor 142 (not shown); a tape drive (not shown); floppy disk drive 152, which reads and writes floppy disks 154; or CD-ROM 150, which reads and/or writes compact disk 156. Such storage means may be referred to as a computer usable medium for storing computer readable program code in the form of data and software.

Data processing system 140 may also be coupled to a network which permits the transfer of data and software between data processing systems. Using such a network, programs can be loaded into data processing system 140.

The components of data processing system 140 discussed above may each be implemented utilizing any one of several known off-the-shelf components. For example, data processing system 140 may be implemented utilizing any general purpose computer or so-called workstation, such as the workstation sold under the name "Model 735" by Hewlett-Packard Company of Palo Alto, Calif.

Figure 6:
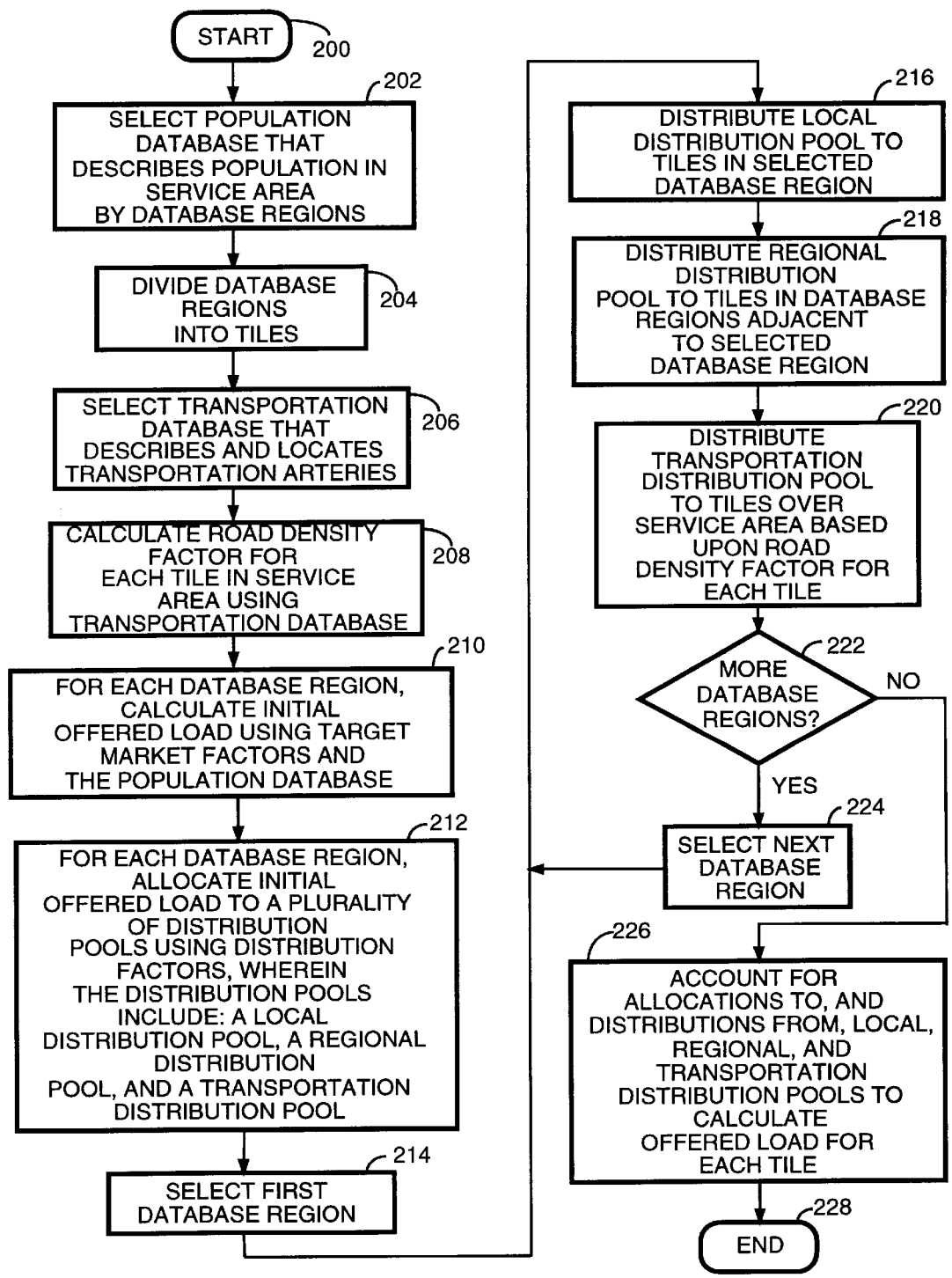
FIG. 6 is a graphical representation of offered load calculated and located in accordance with the method and system of the present invention.

It should be noted that the process illustrated in FIG. 5 and the offered load distribution map shown in FIG. 6 represent the calculation and display of offered load in a communications system service area for a particular time of day. To calculate the offered load in the service area for a different time of day, different distribution factors are selected so that different portions of the offered load may be allocated to the regional, local, and transportation distribution pools in proportions that represent activity on the transportation arteries or movement between a selected database region and regional database regions.

The benefits of the described method and system for calculating and locating an offered load over a coverage region include increased accuracy in placing and estimating the offered load for a particular time of day. This accuracy is derived from (1) recognizing that the offered load is not static—it moves from where system users live and sleep to where system users work and travel; and (2) the method and system of the present invention uses high resolution databases, such as transportation artery databases, to locate offered load in a high resolution manner to specific tiles, and uses low resolution databases such as census information by zip code region, to locate offered load in a low resolution manner to a group of tiles generally.

The foregoing description of a preferred embodiment of the invention has been presented for the purpose of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims and their equivalents, when interpreted in accordance with the breadth to which they are fairly, legally, and equitably entitled.

We claim:

1. A method in a wireless communications system service area model for calculating and locating an offered load, the method comprising the steps of:

selecting a population database that describes a population in database regions in the wireless communications system service area;

selecting a transportation database that describes transportation arteries in the wireless communications system service area;

calculating an initial offered load for each database region;

allocating a portion of each of the initial offered loads to a transportation distribution pool;

distributing the offered load of the transportation distribution pool over the transportation arteries; and accounting for allocation of offered loads to the transportation distribution pool, and for distribution of offered load in the transportation distribution pool over transportation arteries in each database region, wherein a database region offered load is calculated for each database region.

2. The method for calculating and locating an offered load according to claim 1 wherein the step of selecting a population database that describes a population in database regions further includes selecting a population database that describes a population in census tracts, wherein the database includes population in each of a plurality of income groups for each census tract.

3. The method for calculating and locating an offered load according to claim 1 wherein the step of selecting a transportation database that describes transportation arteries further includes selecting a transportation database that describes the location and capacity of roads.

4. The method for calculating and locating an offered load according to claim 3 wherein the step of distributing the offered load of the transportation distribution pool over the transportation arteries further includes distributing the offered load of the transportation distribution pool over the transportation arteries in response to the capacity of each road to produce an offered load per unit distance for each road.

5. The method for calculating and locating an offered load according to claim 1 wherein the step of calculating an initial offered load for each database region further includes calculating an initial offered load for each database region based upon populations classified in a plurality of income groups in each database region.

6. The method for calculating and locating an offered load according to claim 1 wherein the step of accounting for allocation of offered loads to the transportation distribution pool, and for distribution of offered load in the transportation distribution pool over transportation arteries in each database region further includes:

decreasing a database region offered load in response to the portion of the initial offered load allocated to the transportation distribution pool from the database region; and increasing the database region offered load in response to offered load distributed over transportation arteries within the database region.

7. The method for calculating and locating an offered load according to claim 1 further including the steps of:

allocating a second portion of the initial offered load to a regional distribution pool associated with a selected database region; and distributing the offered load of the regional distribution pool to at least one database region adjacent to the selected database region.

8. The method for calculating and locating an offered load according to claim 7 further including the steps of:

distributing a larger portion of the offered load of the regional distribution pool to a database region adjacent to the selected database region; and distributing a smaller portion of the offered load of the regional distribution pool to a database region that is more distant from the selected database region than the adjacent database region.

9. The method for calculating and locating an offered load according to claim 1 further including the steps of:

dividing a selected database region into a plurality of tiles;

distributing a local offered load over the plurality of tiles, wherein the local offered load is a portion of the initial offered load of the selected database region that has not been allocated to any other distribution pool;

for tiles containing transportation arteries, assigning the offered load of a portion of the transportation artery within a selected tile to the selected tile; and calculating an offered load for each of the plurality of tiles by accounting for distribution of the local offered load, and for distribution of offered load in the transportation distribution pool over transportation arteries to tiles having transportation arteries therein.

10. A system for calculating and locating an offered load in a wireless communications system service area model comprising:

means for selecting a population database that describes a population in database regions in the wireless communications system service area;

means for selecting a transportation database that describes transportation arteries in the wireless communications system service area;

means for calculating an initial offered load for each database region;

means for allocating a portion of each of the initial offered loads to a transportation distribution pool;

means for distributing the offered load of the transportation distribution pool over the transportation arteries; and means for accounting for allocation of offered loads to the transportation distribution pool, and for distribution of offered load in the transportation distribution pool over transportation arteries in each database region, wherein a database region offered load is calculated for each database region.

11. The system for calculating and locating an offered load according to claim 10 wherein the means for selecting a population database that describes a population in database regions further includes means for selecting a population database that describes a population in census tracts, wherein the database includes population in each of a plurality of income groups for each census tract.

12. The system for calculating and locating an offered load according to claim 10 wherein the means for selecting a transportation database that describes transportation arteries further includes means for selecting a transportation database that describes the location and capacity of roads.

13. The system for calculating and locating an offered load according to claim 12 wherein the means for distributing the offered load of the transportation distribution pool over the transportation arteries further includes means for distributing the offered load of the transportation distribution pool over the transportation arteries in response to the capacity of each road to produce an offered load per unit distance for each road.

14. The system for calculating and locating an offered load according to claim 10 wherein the means for calculating an initial offered load for each database region further includes means for calculating an initial offered load for each database region based upon populations classified in a plurality of income groups in each database region.

15. The system for calculating and locating an offered load according to claim 10 wherein the means for accounting for allocation of offered loads to the transportation distribution pool, and for distribution of offered load in the transportation distribution pool over transportation arteries in each database region further includes:

means for decreasing a database region offered load in response to the portion of the initial offered load allocated to the transportation distribution pool from the database region; and means for increasing the database region offered load in response to offered load distributed over transportation arteries within the database region.

16. The system for calculating and locating an offered load according to claim 10 further includes:

means for allocating a second portion of the initial offered load to a regional distribution pool associated with a selected database region; and means for distributing the offered load of the regional distribution pool to at least one database region adjacent to the selected database region.

17. The system for calculating and locating an offered load according to claim 16 further includes:

means for distributing a larger portion of the offered load of the regional distribution pool to a database region adjacent to the selected database region; and means for distributing a smaller portion of the offered load of the regional distribution pool to a database region that are more distant from the selected database region than the adjacent database region.

18. The system for calculating and locating an offered load according to claim 10 further includes:
   means for dividing a selected database region into a plurality of tiles;
   means for distributing a local offered load over the plurality of tiles, wherein the local offered load is a portion of the initial offered load of the selected database region that has not been allocated to any other distribution pool;
   means for assigning the offered load of a portion of the transportation artery within a selected tile to the selected tile, wherein the selected tile contains a transportation artery; and
   means for accounting for distribution of the local offered load, and for distribution of offered load in the transportation distribution pool over transportation arteries to tiles having transportation arteries therein, wherein an offered load is calculated for each of the plurality of tiles.

19. A computer program product for calculating and locating an offered load in a wireless communications system service area model comprising:
   a computer usable medium having computer readable program code means for selecting a population database that describes a population in database regions in the wireless communications system service area;
   a computer usable medium having computer readable program code means for selecting a transportation database that describes transportation arteries in the wireless communications system service area;
   a computer usable medium having computer readable program code means for calculating an initial offered load for each database region;
   a computer usable medium having computer readable program code means for allocating a portion of each of the initial offered loads to a transportation distribution pool;
   a computer usable medium having computer readable program code means for distributing the offered load of the transportation distribution pool over the transportation arteries; and
   a computer usable medium having computer readable program code means for accounting for allocation of offered loads to the transportation distribution pool, and for distribution of offered load in the transportation distribution pool over transportation arteries in each database region, wherein a database region offered load is calculated for each database region.

20. The computer program product for calculating and locating an offered load according to claim 19 wherein the computer usable medium having computer readable program code means for selecting a population database that describes a population in database regions further includes a computer usable medium having computer readable program code means for selecting a population database that describes a population in census tracts, wherein the database includes population in each of a plurality of income groups for each census tract.

21. The computer program product for calculating and locating an offered load according to claim 19 wherein the a computer usable medium having computer readable program code means for selecting a transportation database that describes transportation arteries further includes a computer usable medium having computer readable program code means for selecting a transportation database that describes the location and capacity of roads.

22. The computer program product for calculating and locating an offered load according to claim 21 wherein the computer usable medium having computer readable program code means for distributing the offered load of the transportation distribution pool over the transportation arteries further includes a computer usable medium having computer readable program code means for distributing the offered load of the transportation distribution pool over the transportation arteries in response to the capacity of each road to produce an offered load per unit distance for each road.

23. The computer program product for calculating and locating an offered load according to claim 19 wherein the computer usable medium having computer readable program code means for calculating an initial offered load for each database region further includes a computer usable medium having computer readable program code means for calculating an initial offered load for each database region based upon populations classified in a plurality of income groups in each database region.

24. The computer program product for calculating and locating an offered load according to claim 19 wherein the computer usable medium having computer readable program code means for accounting for allocation of offered loads to the transportation distribution pool, and for distribution of offered load in the transportation distribution pool over transportation arteries in each database region further includes:
   a computer usable medium having computer readable program code means for decreasing a database region offered load in response to the portion of the initial offered load allocated to the transportation distribution pool from the database region; and
   a computer usable medium having computer readable program code means for increasing the database region offered load in response to offered load distributed over transportation arteries within the database region.

25. The computer program product for calculating and locating an offered load according to claim 19 further includes:
   a computer usable medium having computer readable program code means for allocating a second portion of the initial offered load to a regional distribution pool associated with a selected database region; and
   a computer usable medium having computer readable program code means for distributing the offered load of the regional distribution pool to at least one database region adjacent to the selected database region.

26. The computer program product for calculating and locating an offered load according to claim 25 further includes:
   a computer usable medium having computer readable program code means for distributing a larger portion of the offered load of the regional distribution pool to database regions adjacent to the selected database region; and a computer usable medium having computer readable program code means for distributing a smaller portion of the offered load of the regional distribution pool to database regions that are more distant from the selected database region than the adjacent database regions.

27. The computer program product for calculating and locating an offered load according to claim 19 further includes:

a computer usable medium having computer readable program code means for dividing a selected database region into a plurality of tiles;

a computer usable medium having computer readable program code means for distributing a local offered load over the plurality of tiles, wherein the local offered load is a portion of the initial offered load of the selected database region that has not been allocated to any other distribution pool;

a computer usable medium having computer readable program code means for assigning the offered load of a portion of the transportation artery within a selected tile to the selected tile, wherein the selected tile contains a transportation artery; and a computer usable medium having computer readable program code means for accounting for distribution of the local offered load, and for distribution of offered load in the transportation distribution pool over transportation arteries to tiles having transportation arteries therein, wherein an offered load is calculated for each of the plurality of tiles.

* * * * *